United States Patent [19]

Naemura et al.

[11] Patent Number: 5,286,408
[45] Date of Patent: Feb. 15, 1994

[54] LIQUID CRYSTAL DISPLAY DEVICE

[75] Inventors: Shohei Naemura, Yokohama, Japan; Eike Poetsch, Mühltal; Ulrich Finkienzeller, Plankstadt, both of Fed. Rep. of Germany; Toshiyuki Hirai, Tenri, Japan; Shuichi Kouzaki, Nara, Japan; Fumiaki Funada, Yamatokohriyama, Japan

[73] Assignee: Sharp Kabushiki Kaisha, Osaka, Japan

[21] Appl. No.: 814,408

[22] Filed: Dec. 24, 1991

[30] Foreign Application Priority Data

Dec. 28, 1990 [JP] Japan .................................. 2-409225

[51] Int. Cl.$^5$ ......................... C09K 19/52; G02F 1/13
[52] U.S. Cl. .............................. 252/299.01; 359/51; 359/52; 359/54; 359/103
[58] Field of Search ......................... 252/299.1; 428/1; 359/51, 52, 103, 54

[56] References Cited

U.S. PATENT DOCUMENTS

| | | | |
|---|---|---|---|
| 5,064,567 | 11/1991 | Funada et al. | 252/299.61 |
| 5,150,232 | 9/1992 | Gunkima et al. | 359/51 |
| 5,167,860 | 12/1992 | Sawada et al. | 252/299.63 |

FOREIGN PATENT DOCUMENTS

| | | |
|---|---|---|
| 362776A3 | 10/1988 | European Pat. Off. . |
| 359146A2 | 9/1989 | European Pat. Off. . |
| 4005869A1 | 9/1990 | Fed. Rep. of Germany . |
| 61-502128 | 9/1986 | Japan . |
| 2-96714 | 4/1990 | Japan . |
| 3-52843 | 8/1991 | Japan . |
| WO83/01016 | 9/1982 | PCT Int'l Appl. . |
| WO85/04262 | 3/1985 | PCT Int'l Appl. . |
| WO90/04623 | 5/1990 | PCT Int'l Appl. . |

OTHER PUBLICATIONS

Y. Hirai, et al., Polymer Preprints, Japan vol. 38, No. 7, pp. 2151-2153, 2154-2156 (1989).

Primary Examiner—Robert L. Stoll
Assistant Examiner—Shean C. Wu
Attorney, Agent, or Firm—David G. Conlin; Linda M. Buckley

[57] ABSTRACT

It is an object of the present invention to provide a polymer dispersion-type liquid crystal display device having a high holding rate, a superior display quality and a high reliability; the liquid crystal display device according to the present invention composed of (i) a display electrode substrate, (ii) a counter electrode substrate and (iii) a liquid crystal layer interposed between said display electrode substrate and said counter electrode substrate, in which liquid crystals having a positive anisotropy in dielectric constant are dispersed in a transparent polymer; the transparent polymer is a photo cation polymerization setting-type transparent polymer and the liquid crystals are fluorine-containing aryl compounds.

3 Claims, 5 Drawing Sheets

LIQUID CRYSTAL DISPLAY DEVICE

BACKGROUND OF THE INVENTION

The present invention relates to an active matrix-type liquid crystal display device having a high holding rate using a polymer dispersion-type liquid crystal display mode.

The TN-type and STN-type display elements using nematic liquid crystals have been practically used as the display element utilizing a photoelectric effect. Also the display elements using highly dielectric liquid crystals have been proposed. These require a polarizing plate and an orientating treatment. On the other hand, the dynamic scattering (DS) effect and the phase conversion (PC) effect do not require the polarizing plate but utilize the scattering by the liquid crystals. However, problems have occurred in that for example the former requires the addition of ionic additives or the high driving voltage and thus it is not suitable for the active matrix LCD.

Recently, a polymer dispersion-type liquid crystal display element utilizing the scattering by the liquid crystals has been proposed as the liquid crystal display mode without requiring the polarizing plate and the orientating treatment (refer to Japanese Patent Appln. KOKAI No. 55-96922).

It has been disclosed in for example Japanese Patent Appln. KOHYO No. 58-501631 that nematic liquid crystals having a positive anisotropy of dielectric constant are mixed in an aqueous solution of polyvinyl alcohol to obtain an emulsion with liquid crystals dispersed and the obtained emulsion is applied to a substrate having a transparent electrode followed by evaporating water to produce a film with the liquid crystals having a positive anisotropy of dielectric constant dispersed in a PVA film and then a substrate having a transparent electrode is stuck to the resulting film to obtain a liquid crystal display element.

In addition, it has been disclosed in Japanese Patent Appln. KOHYO No. 61-502128 that an epoxy resin-setting agent and liquid crystals are blended to be dissolved and the resulting mixture is put between a pair of substrates provided with a transparent electrode followed by heating to set said epoxy resin, whereby obtaining a liquid crystal display element with liquid crystals having a positive anisotropy in dielectric constant dispersed in the epoxy resin.

Also the general polymers, such as acrylic resins and urethane resins, have been known as the transparent polymers for dispersing the liquid crystal in addition to the above described epoxy resins and also liquid crystal display elements using these polymers have been proposed.

In the elements with liquid crystals having a positive anisotropy in dielectric constant dispersed in these polymers, said liquid crystals are orientated at random and a light incident upon the element is scattered on a boundary of the liquid crystal and a polymer to make the liquid crystal cloudy, whereby reducing a transmissivity of the liquid crystal, due to said anisotropy in dielectric constant of the liquid crystals when no voltage is applied. Upon applying a voltage to the element, the liquid crystals are orientated due to the positive anisotropy in dielectric constant thereof so that the direction of electric field may be the direction of long axis and a light incident upon the element is not scattered but transmitted through the element. That is to say, the element becomes transparent.

The element with the liquid crystals dispersed in the high molecule (polymer) has been utilized as a light-regulating glass aiming at the regulation of an incident light in intensity by applying said voltage or not applying the voltage to switch-over to the scattering condition and the transmissive condition in the above described manner.

In addition, recently, liquid crystal display devices using the above described element with the liquid crystals dispersed in the polymer in place of the TN-type liquid crystals have been actively developed as the active matrix-type with the nonlinear active element, such as switching transistor, added to the respective image elements. Although the TN-type liquid crystals are the present main current of the active matrix-type liquid crystal display devices, a problem has occurred in that two pieces of polarizing plate are required and a light is absorbed by these polarizing plates to reduce a brightness of a transmitted light to at most a half or less of that of an incident light. On the contrary, the element with the liquid crystals dispersed in the polymer does not require the polarizing plate, so that a utilization efficieny of light during the transmission can be improved and thus a bright display can be obtained.

The liquid crystal display device of this type with the switching transistor added comprises (i) a display electrode substrate provided with signal electrodes, scanning electrodes, switching transistors formed at the respective points of intersection of said signal electrodes and said scanning electrodes and display image element electrodes arranged on a first transparent insulating substrate, (ii) a counter electrode substrate provided with a counter electrode arranged on a second transparent insulating substrate so as to be positioned within a range corresponding to said display image element electrodes and (iii) a liquid crystal layer with liquid crystals having a positive anisotropy in dielectric constant dispersed in a transparent polymer interposed between said display electrode substrate and said counter electrode substrate.

An equivalent circuit of the respective display image elements is shown in FIG. 3. In addition, a wave form of a driving voltage in said equivalent circuit, that is wave forms of a signal voltage $V_S$, a scanning voltage $V_G$ and a voltage $V_D$ applied to said liquid crystal layer, is shown in FIG. 4. As obvious also from these drawings, when said switching transistor is switched on by said voltage $V_G$, $V_S$ is charged in the liquid crystal layer (equivalently serving as a condenser $C_{LC}$) and held for a time until the switching transisitor is switched on again, so that $V_D$ is applied to the liquid crystal layer to generate a static driving and thus the similar superior display characteristics can be obtained.

However, in fact, a resistance component (equivalently serving as a resistance $R_{LC}$) resulting from electrically conductive impurities coming from outside and formed by the decomposition of the liquid crystals and the like exist in the liquid crystal layer serving as said condenser $C_{LC}$, as shown in FIG. 5, so that $V_D$ is discharged through the liquid crystal layer to be attenuated with the lapse of time, as shown in FIG. 5. As a result, an effective voltage applied to the liquid crystal layer is lowered. The liquid crystals show a cumulative response effect against a voltage, so that the display characteristics are dependent upon said effective voltage. The display contrast is deteriorated with a decrease of the effective voltage (a holding rate defined by a ratio of an effective value of $V_D$ to that in the case where it is supposed that said resistance component of the liquid crystal layer is infinitely high is used as a parameter for evaluating a degree of said decrease of the effective voltage).

In the conventional polymer dispersion-type liquid crystal display element, liquid crystals having an increased anisotropy in refractive index ($\Delta n$), such as cyano biphenyl family liquid crystals and cyano pyrimidine family liquid crystals, are used in order to heighten the light-scattering intensity but problems have occurred in that not only the holding rate of these liquid crystals themselves is inferior but also the holding rate is still more decreased in the case where they are dispersed in a polymer and their solution has been requested Problems to be Solved by the Invention.

SUMMARY OF THE INVENTION

The object of the present invention is to provide a polymer dispersion-type liquid crystal display device having a high holding rate, a superior display quality and a high reliability.

The liquid crystal display device according to the present invention comprises (i) a display electrode substrate, (ii) a counter electrode substrate and (iii) a liquid crystal layer (8) interposed between said display electrode substrate and said counter electrode substrate, in which liquid crystals having a positive anisotropy in dielectric constant are dispersed in a transparent polymer; the transparent polymer is a photo cation polymerization setting-type transparent polymer and the liquid crystals comprise at least one kind of liquid crystal selected from the group consisting of compounds expressed by the following chemical formulae [I] and/or [II]:

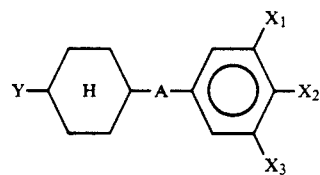

wherein $X_1$, $X_2$ and $X_3$ independently represent H, F, $CF_3$ or $OCF_3$; A represents a single bond, —CH=CH—, —C≡C— or —COO—; Y represents $C_nH_{2n+1}$— or

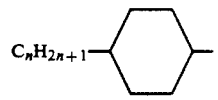

(n represents a number of 2 to 10)

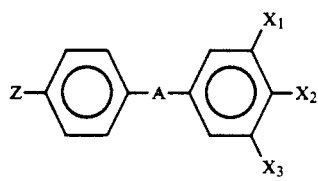

wherein $X_1$ to $X_3$ and A have the same meaning as in [I]; Z represents $C_nH_{2n+1}$—,

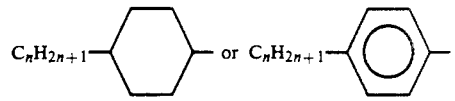

(n has the same meaning as in [I])

DETAILED DESCRIPTION OF THE INVENTION

Figure 1:
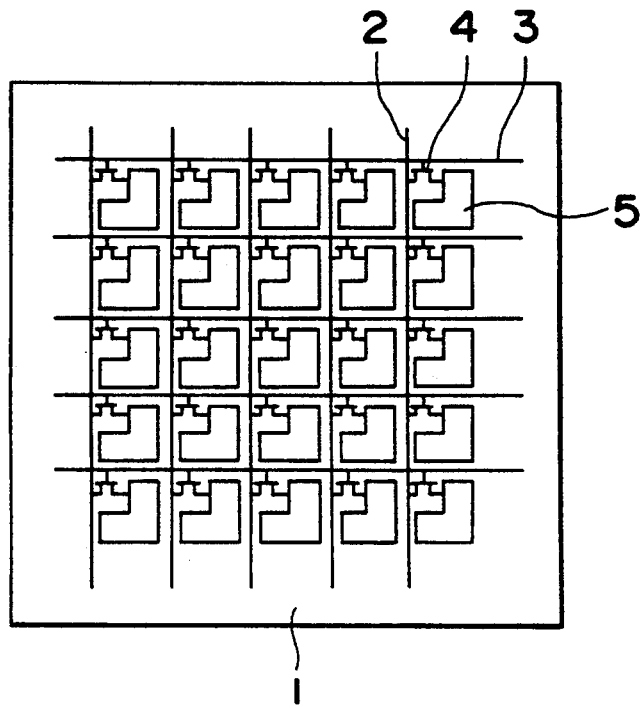
FIG. 1 is a schematic plane view showing one embodiment of a display electrode substrate in a liquid crystal display device according to the present invention.

The present invention relates to a liquid crystal display device comprising (i) a display electrode substrate provided with signal electrodes (2), scanning electrodes (3), switching transistors (4) formed at the respective points of intersection of said signal electrodes and said scanning electrodes and display image element electrodes (5) on a first transparent insulating substrate (1), (ii) a counter electrode substrate provided with a counter electrode (7) arranged on a second transparent insulating substrate (6) so as to be positioned within an opposite range of said display image element electrodes (5), and (iii) a liquid crystal layer (8) with liquid crystals having a positive anisotropy in dielectric constant dispersed in a transparent polymer interposed between said display electrode substrate and said counter electrode substrate, wherein said transparent polymer is a cation polymerization photo-setting-type transparent polymer and said liquid crystals comprise at least one kind of liquid crystal selected from the group consisting of compounds expressed by the following chemical formulae [III] and/or [IV]:

[III]

wherein $X_1$, $X_2$ and $X_3$ independently represent H, F, $CF_3$ or $OCF_3$; A represents a single bond, —CH=CH—, —C≡C— or —COO—; Y represents $C_nH_{2n+1}$— or

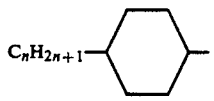

(n represents a number of 2 to 10),

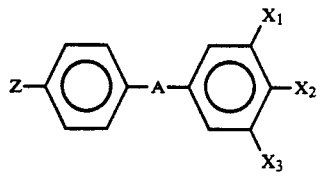

wherein $X_1$ to $X_3$ and A have the same meaning as in [III]; Z represents $C_nH_{2n+1}-$,

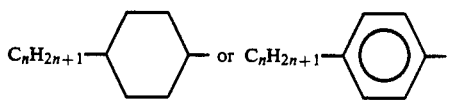

(n has the same meaning as in [III]).

Figure 2:
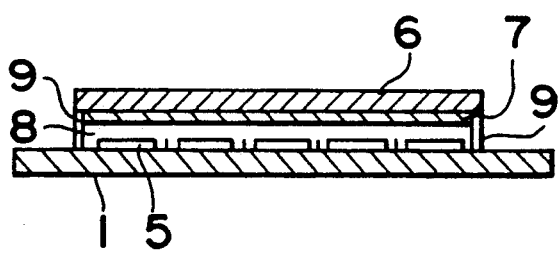
FIG. 2 is a schematic sectional view showing one embodiment of a liquid crystal display device shown in FIG. 1.

FIG. 1 is a schematic plane view showing one embodiment of the display electrode substrate of a liquid crystal display device according to the present invention; and FIG. 2 is a schematic sectional view showing one embodiment of said liquid crystal diaplay device shown in FIG. 1.

In the liquid crystal display device according to the present invention, ones, which have been usually used in the conventional polymer dispersion-type liquid crystal devices, can be suitably used as the transparent insulating substrates (1) and (6), the signal electrodes (2), the scanning electrodes (3), the switching transistors (4), the display image element electrodes (5) and the counter electrode (7).

Feature of the present invention consists in that a cation polymerization photo-setting-type polymer is used as a transparent polymer for dispersing liquid crystals therein.

A base polymer includes an epoxy polymer and the like.

A photo cation polymerization initiator includes onium salts, such as diazonium salts, iodonium salts, sulfonium salts, sulfoxonium salts and iodosil salts, [refer to for example U.S. Pat Nos. 3,205,157, 3,708,296, 4,173,476 and 4,197,174; EP 0,104,143, 0,104,144, 0,106,797, and 0,146,501; "Macromolecules"., Vol. 10, p. 1,307 (1977); and "J. Polym Sci. Polym. Chem. Ed."., Vol. 18, p. 2,677 and 2,697 (1980)] as well as metal-allen complexes such as benzene cyclopentadienyl iron, metal-carbonyl complexes and metal complexes such as aluminum ethylacetoacetatetriphenylsilanol [refer to for example EP 0,109,851, 0,126,712, 0,094,914 and 0,094,915; and "Macromolecules"., Vol. 18, p. 1,799 (1985)].

The above described onium salts and metal complexes are in particular suitable as said photo cation polymerization initiator but also other photo cation polymerization initiator can be suitably used.

The second feature of the present invention consists in that the liquid crystal layer (8) with the liquid crystals containing at least one kind of liquid crystal selected from the group consisting of compounds expressed by the above described chemical formulae [III] and/or [IV] dispersed in the above described cation polymerization photo-setting-type transparent polymer matrix is interposed between the display electrode substrate and the counter electrode substrate, as shown in FIG. 2.

In these specified chemical formulae, $X_1$ to $X_3$ represent H, F, $CF_3$ or $OCF_3$; A represents a single bond, $-CH=CH-$, $-C\equiv C-$ or $-COO-$; Y represents $C_nH_{2n+1}-$ or

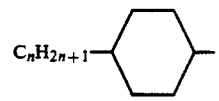

(n represents a number of 2 to 10); Z represents $C_nH_{2n+1}-$,

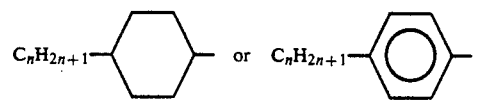

(n represents a number of 2 to 10).

The above described liquid crystals may be suitably used in combination with other nematic liquid crystals and smetic liquid crystals which have been usually used in the conventional liquid crystal display devices.

A quantity of the liquid crystals dispersed in the transparent polymer matrix is not specially limited but they are usually used in a quantity of 10 to 95% by weight, preferably 20 to 90% by weight.

The liquid crystal layer (8) interposed between the the display electrode substrate and the counter electrode substrate is sealed up with a sealant (9), for example an epoxy sealant and the like.

In the liquid crystal layer with the liquid crystal having the positive anisotropy in dielectric constant dispersed in the polymer formed by using the photo cation polymerization initiator, the voltage-holding rate can be increased by using the above described fluorine-containing liquid crystal and additionally cations used for polymerization can be prevented from leaching, so that the reduction of a quantity of the voltage, which has been charged in the liquid crystal layer, discharged and the polymerization of the high molecules as a dispersant can be made progress at the same time. As a result, the liquid crystal display device having superior display characteristics and superior also in reliability can be obtained. The above described possibility of the improved reliability by the introduction of the photo cation polymerizable high molecules results from that in general the photopolymerization methods of the high molecules are classified into two kinds, that is the photo radical polymerization and the photo cation polymerization, but in general a hindrance in setting by oxygen in the photo cation polymerization is reduced in comparison with the photo radial polymerization and thus the photo cation polymerization can be applied without a hindrance in photosetting even in the case where a layer- thickness is 5 μm or more, a contraction in volume during the setting being small to an extent of 2 to 4% and thus an adhesion to a glass substrate and the like being improved, whereby water, impurities and the like being prevented from entering from outside of a cell, and a chemical resistance and a heat resistance being superior.

The present invention is illustrated by the following Examples.

EXAMPLE 1

A pair of transparent insulating substrates made of glass provided with transparent electrodes made of ITO formed thereon were stuck each other through a spacer of 10 μm thick so that said transparent electrodes may stand face to face, and the both substrates were fixed with sealing adhesives of an epoxy resins to give a cell. This cell was filled with various kinds of a ultraviolet setting-type resin and was cured by the irradiation with ultraviolet rays to produce test cells.

Figure 3:
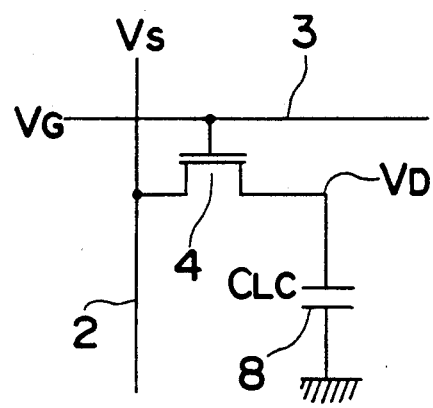
FIG. 3 is an equivalent circuit of display image element electrodes.
Figure 4:
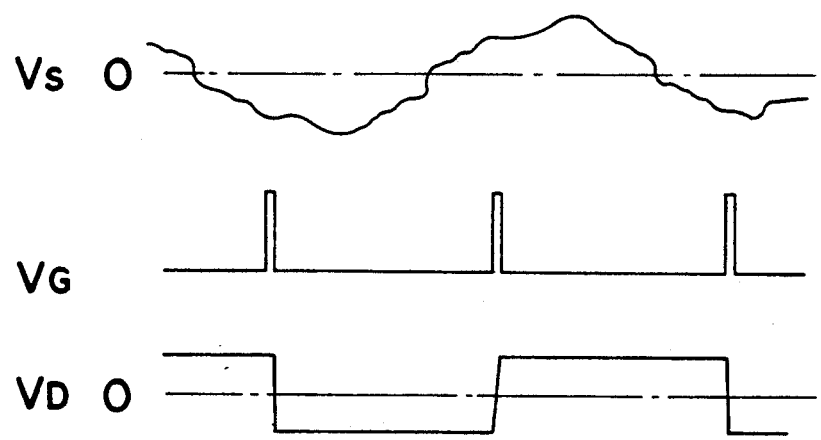
FIG. 4 is a diagram showing wave shapes of voltages $V_S$, $V_G$ and $V_D$ in the circuit shown in FIG. 3.
Figure 5:
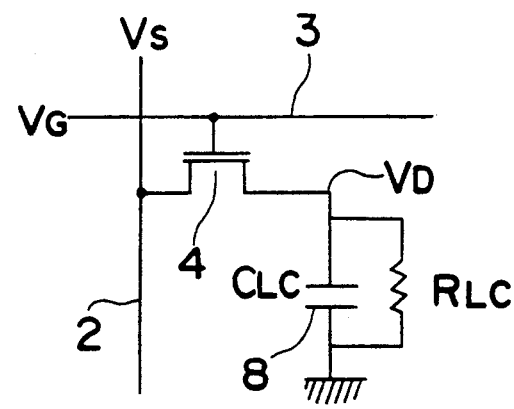
FIG. 5 is an equivalent circuit of actual display image element electrodes.
Figure 6:
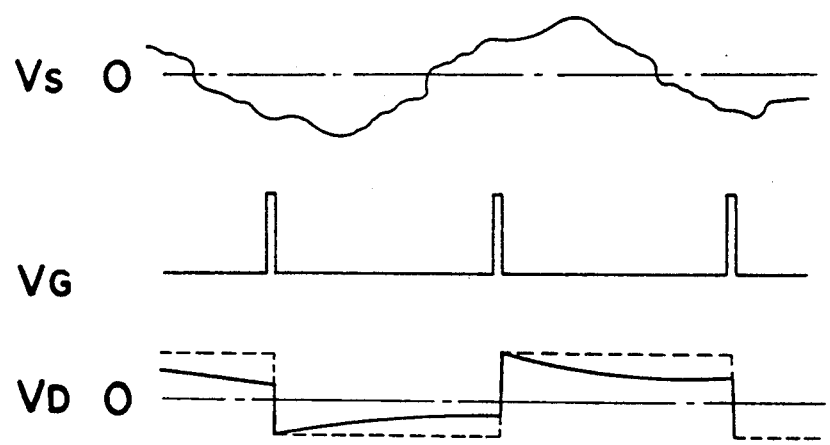
FIG. 6 is a diagram showing wave shapes of voltages $V_S$, $V_G$ and $V_D$ in said circuit shown in FIG. 5.
Figure 7:
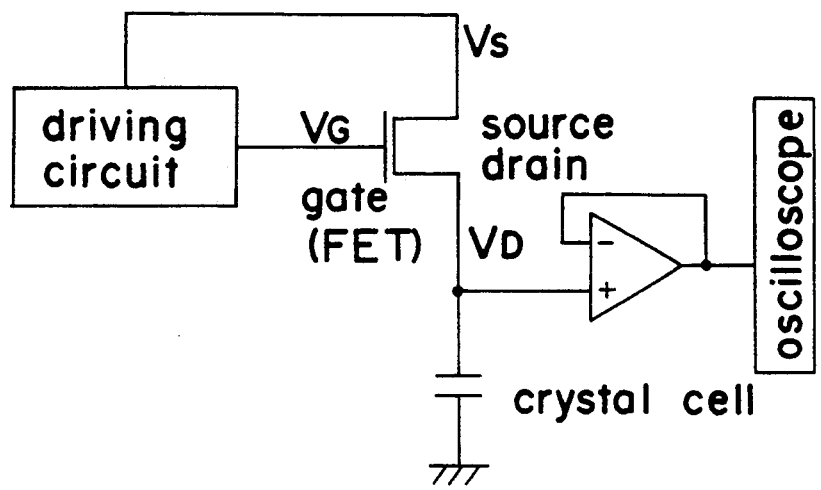
FIG. 7 is a circuit of a holding rate-measuring device.
Figure 8:
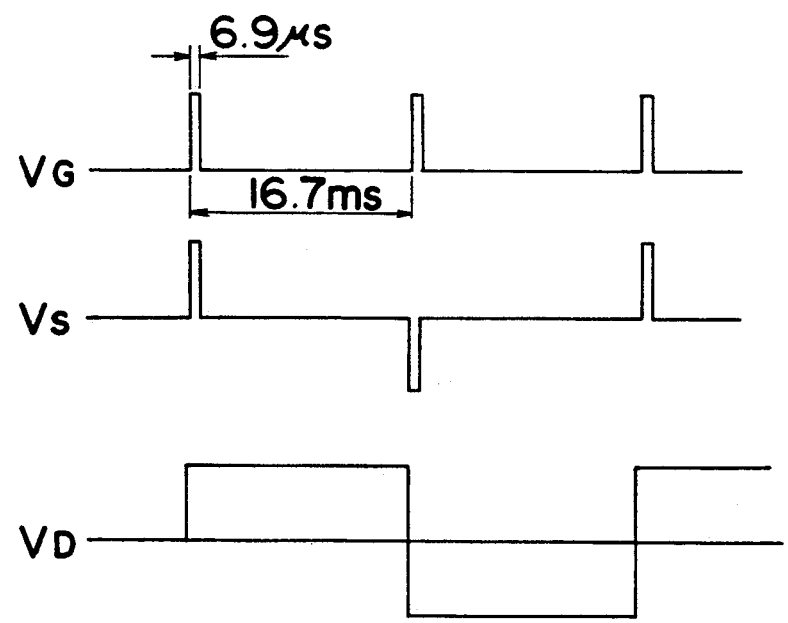
FIG. 8 is a diagram showing wave shapes of voltages $V_G$, $V_S$ and $V_D$ in said circuit shown in FIG. 7.

A value of holding rate was measured by a holding rate-measuring system shown in FIG. 3 by the use of these test cells. This system comprises switching transistors (FET) for applying a voltage between the electrodes, a driving circuit and a circuit for measuring a discharging of a charge accumulated between the cells.

In addition, 50 parts of said ultraviolet polymerization setting-type resin was mixed with 150 parts of liquid crystal compositions shown in Table 1 as fluorine-containing liquid crystal having a positive anisotropy in dielectric constant to test their affinity. According to the above affinity test the mixture, in which the ultraviolet polymerization setting-type resin can be uniformly mixed with the fluorine-containing liquid crystals was injected into the evaluation cell, and was irradiated with ultraviolet rays to give cells, in which liquid crystals were dispersed in the polymer. The holding rate of the cell was determined. The results shown in Table 2.

TABLE 1

| Ingredient to be added or properties | Liquid crystal composition | | |
|---|---|---|---|
| | I | II | III |
| Quantity added (wt %) | | | |
| $C_5H_{11}$—(H)—(O)—F | 12 | 10 | 12 |
| $C_6H_{13}$—(H)—(O)—F | 10 | 10 | 10 |
| $C_7H_{15}$—(H)—(O)—F | 10 | 10 | 10 |
| $C_3H_7$—(H)—(O)—(O)—(H)—$C_3H_7$, with F substituent | 3 | 5 | — |
| $C_5H_{11}$—(H)—(O)—(O)—(H)—$C_3H_7$, with F substituent | 4 | 5 | 3 |
| $C_5H_{11}$—(H)—(O)—(O)—(H)—$C_5H_{11}$, with F substituent | 3 | 4 | 2 |
| $C_3H_7$—(H)—(H)—(O)—$OCF_3$ | 13 | 13 | 13 |
| $C_5H_{11}$—(H)—(H)—(O)—$OCF_3$ | 12 | 12 | 12 |

TABLE 1-continued

| Ingredient to be added or properties | Liquid crystal composition | | |
|---|---|---|---|
| | I | II | III |
| 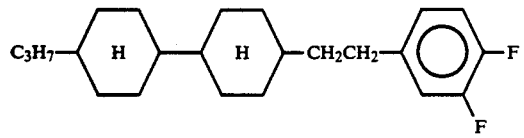 C$_3$H$_7$—H—H—CH$_2$CH$_2$—⟨⟩—F (with F) | 13 | — | 12 |
| 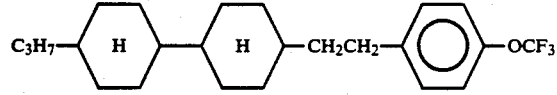 C$_3$H$_7$—H—H—CH$_2$CH$_2$—⟨⟩—OCF$_3$ | 11 | 11 | 11 |
| 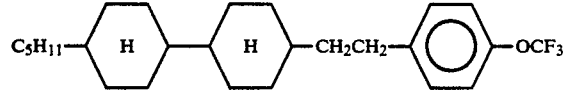 C$_5$H$_{11}$—H—H—CH$_2$CH$_2$—⟨⟩—OCF$_3$ | 9 | 9 | 9 |
| 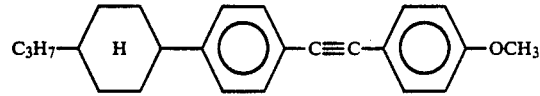 C$_3$H$_7$—H—⟨⟩—C≡C—⟨⟩—OCH$_3$ | — | — | 6 |
| 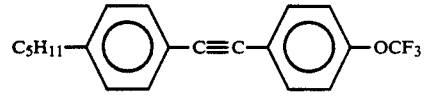 C$_5$H$_{11}$—⟨⟩—C≡C—⟨⟩—OCF$_3$ | — | 11 | 0 |
| Nematic isotropic phase transition temperature (°C.) | 90 | 89 | 89 |
| Viscosity (mm$^2$/S) (20° C.) | 14 | 13 | 14 |
| Anisotropy in dielectric constant (Δε) | 4.3 | 4.1 | 4.3 |
| Anisotropy in refractive index (Δn) | 0.080 | 0.095 | 0.089 |

TABLE 2

| No. | Supplier | Commercial name of the polymer | Kinds of polymer | Polymerization | Holding rate (25° C.) of polymer only | Mixture of polymer and liquid crystal |
|---|---|---|---|---|---|---|
| A | Sanyo Kasei KK | MSE-04 | Epoxy-acrylates | Radical polymerization | 97.7% | immiscible |
| B | Sanyo Kasei KK | MSU-57 | Urethane-acrylates | Radical polymerization | 91.8% | immiscible |
| C | Yokohama Gomu KK | EH-213 | Epoxys | Photo cation polymerization | 97.0% | 93.9% |
| D | Yokohama Gomu KK | UD-246H | Acrylates | Radical polymerization | 87.2% | immiscible |
| E | Denki Kagaku Kogyo KK | OP-1045K | Acrylates | Radical polymerization | 71.8% | immiscible |

It is found from the results shown in Table 2 that the photo cation polymerizable epoxy polymer, the sample C only exhibits high affinity to the fluorine-containing liquid crystals and high holding rate. On the contrary, the other polymer, radical polymerization polymer did not exhibit the affinity to the fluorine-containing liquid crystals at all, and thus cells in which the liquid crystals were dispersed in the polymer could not be produced.

EXAMPLE 2

The affinity of various kinds of ultraviolet polymerization setting-type resin (samples A to E) shown in Table 2 of EXAMPLE 1 to a liquid crystal composition II shown in Table 1 and the holding rate were investigated. As the result, merely the photo cation polymerizable epoxy polymer (Sample C) exhibited a high affinity to the following fluorine-containing liquid crystal materials and the high holding rate of 95% in the same manner as in EXAMPLE 1. On the contrary, other radical polymerization products did not exhibit the affinity to the fluorine-containing liquid crystal materials at all and thus the cells in which liquid crystals were dispersed in the polymer could not be produced.

EXAMPLE 3

The affinity of various kinds of ultraviolet polymerization setting-type resin (samples A to E) shown in Table 1 of EXAMPLE 1 to a liquid crystal composition III shown in Table 1 and the holding rate were investigated. As the result, merely the photo cation polymerizable epoxy polymer (sample C) exhibited a high affinity to the following fluorine-containing liquid crystal and the high holding rate of 93% in the same manner as in EXAMPLE 1. On the contrary, other radical polymerization products did not exhibit the affinity to the fluorine-containing liquid crystal at all, and thus the cells in which liquid crystals were dispersed in polymer could not be produced.

COMPARATIVE EXAMPLE 1

The affinity of the respective polymers A to E investigated in EXAMPLE 1 to the conventional cyanobiphenyl type liquid crystals (E8: produced by BDH), and the holding rate were evaluated. The results of the evaluation are shown in Table 3. In addition, the method of producing the test cell and the method of measuring the holding rate were conducted in quite the same manner as in EXAMPLE 1.

TABLE 3

| No. | Supplier | Commercial name of the polymer | Kinds of polymer | Polymerization | Holding rate in the case where the polymer is mixed with E8 |
| --- | --- | --- | --- | --- | --- |
| A | Sanyo Kasei KK | MSE-04 | Epoxy-acrylates | Radical polymerization | 39.0% |
| B | Sanyo Kasei KK | MSU-57 | Urethane-acrylates | Radical polymerization | 38.0% |
| C | Yokohama Gomu KK | EH-213 | Epoxys | Photo cation polymerization | Not set after applying with ultraviolet rays |
| D | Yokohama Gomu KK | UD-246H | Acrylates | Radical polymerization | 42.1% |
| E | Denki Kagaku Kogyo KK | OP-1045K | Acrylates | Radical polymerization | 42.9% |

It was found from the results shown in Table 3 that every polymer other than the sample C exhibits the good affinity to E8, but the holding rate is remarkably bad and as the result they can not be practically used (practically the holding rate of 90% or more is required). In addition, the sample C was not set at all even by the irradiation of ultraviolet ray after mixing with E8.

EXAMPLE 4

Figure 9:
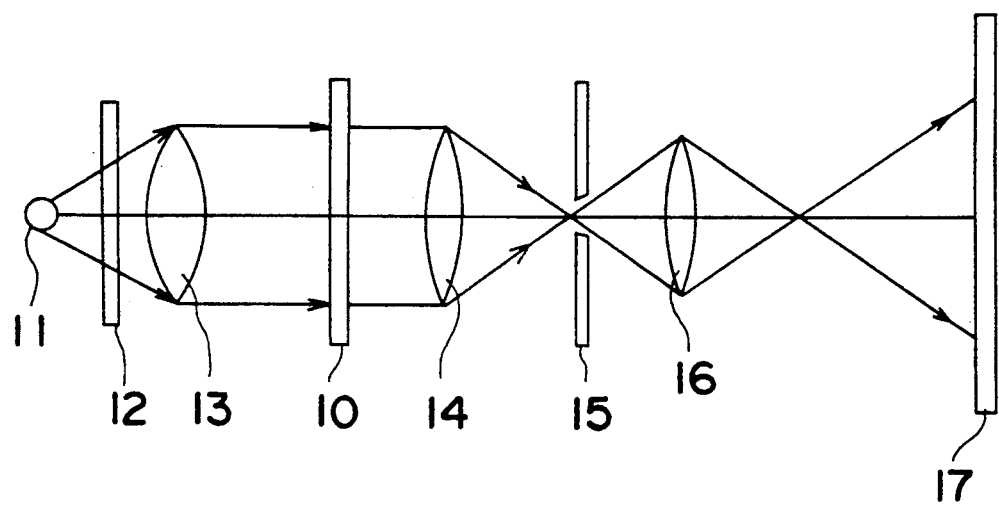
FIG. 9 is a block diagram showing one embodiment a projecting device according to the present invention.

FIG. 9 shows a construction of a projection device obtained using a liquid crystal display element comprising the sample C and switching transistors added in EXAMPLE 1 of the present invention. Referring to FIG. 9, the image display was conducted by the incidence of parallel beams from a projecting light source (11) through a heat ray-cutting filter (12) and then a condenser lens (13) upon an image-forming display element 10 and condensing the beams, which have transmitted through said liquid crystal display element (10), by means of a lens 14 followed by projecting an image on a screen (17) through an iris (15) by means of an projecting lens 16.

The liquid crystal display element (10) has a construction shown in FIG. 1 and FIG. 2. The liquid crystal display element (10) is composed by interposing a liquid crystal layer (8) between a display electrode substrate and a counter electrode substrate, in which a flourine-containing liquid crystal material having a positive anisotropy in dielectric constant is dispersed in the polymer. A transparent insulating substrate (1) made of glass not exhibiting a multiple refraction is provided with bus lines, such as signal lines (2) and scanning lines (3), image element electrodes (5) and switching transistors corresponding to said bus lines arranged in a matrix state thereon to form said display electrode substrate of active matrix driving mode. An a-Si thin film transistor (TFT) is formed as said switching transistors (4). Said counter electrode substrate is composed with a transparent insulating substrate (6) made of glass similarly and a counter electrode (7) formed facing the respective image element electrodes (5) of the display electrode substrate on said transparent insulating substrate (6). The image element electrodes (5) and said counter electrode (7) are transparent electrodes for applying a voltage to said liquid crystal layer (8) and made of ITO. The liquid crystal layer (8) is sealed up with a sealant (9) made of an epoxy resin.

Said projection device using the liquid crystal display element with the switching transistors added produced in the above described manner exhibited a high contrast (50:1 or more) and a high display quality. Even in the electrified aging test for 500 hours at 50° C. the holding rate was not reduced, an uneven display and the like being not observed, the contrast being high, and the display quality being high.

As above described, according to the present invention, the liquid crystal display device having the high holding rate and thus having the superior display quality and the high reliability can be provided by using the liquid crystal layer with the chemically stable fluorine-containing liquid crystal material having the positive anisotropy in dielectric constant dispersed in the polymer with using the photo cationic polymerization initiator as the polymerization initiator in the liquid crystal display device with the switching transistors, such as a-Si TFT and p-Si TFT, added.

What is claimed is:

1. A liquid crystal display device comprising (i) a display electrode substrate provided with signal electrodes, scanning electrodes, switching transistors formed at the respective points of intersection of said signal electrodes and said scanning electrodes and display image element electrodes on a first transparent insulating substrate, (ii) a counter electrode substrate provided with a counter electrode arranged on a second transparent insulating substrate so as to be positioned within an opposite range of said display image element electrodes, and (iii) a liquid crystal layer with liquid crystals having a positive anisotropy in dielectric constant dispersed in a transparent polymer interposed between said display electrode substrate and said counter electrode substrate, wherein said transparent polymer is a cation polymerization photo-setting-type transparent polymer and said liquid crystals comprise at least one kind of liquid crystal selected from the group consisting of compounds expressed by the following chemical formulae [I] and/or [II]:

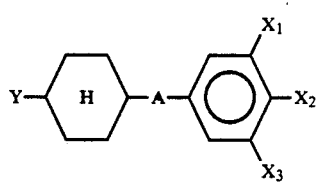

wherein $X_1$, $X_2$ and $X_3$ independently represent H, F, $CF_3$ or $OCF_3$; A represents a single bond, —$CH_2CH_2$—, —C≡C— or —COO—; Y represents $C_nH_{2n+1}$— or

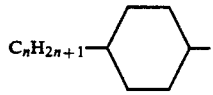

(n represents a number of 2 to 10),

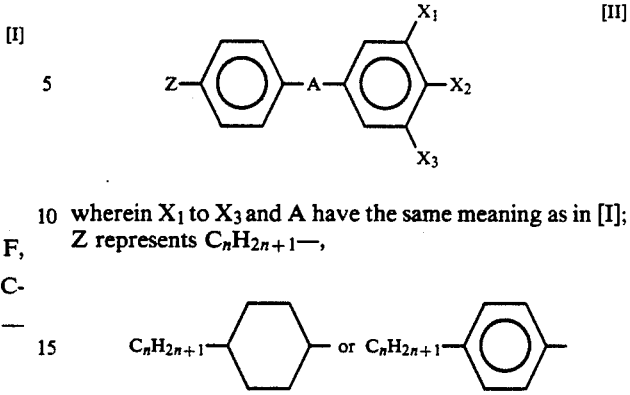

wherein $X_1$ to $X_3$ and A have the same meaning as in [I]; Z represents $C_nH_{2n+1}$—, (n has the same meaning as in [I]).

2. A projection device, comprising a liquid crystal display device as set forth in claim 1.

3. A liquid crystal display device as set forth in claim 1, wherein at least one of $X_1$, $X_2$ and $X_3$ is F, $CF_3$ or $OCF_3$.

* * * * *

UNITED STATES PATENT AND TRADEMARK OFFICE
CERTIFICATE OF CORRECTION

PATENT NO. : 5,286,408

DATED : February 15, 1994

INVENTOR(S) : Naemura et al.

It is certified that error appears in the above-identified patent and that said Letters Patent is hereby corrected as shown below:

On the cover sheet, Item 73, add "Merck Patent Gesellschaft Mit Beschrankter, Darmstadt, Germany"

Signed and Sealed this

Twenty-sixth Day of July, 1994

*Attest:*

BRUCE LEHMAN

*Attesting Officer*  *Commissioner of Patents and Trademarks*